(12) United States Patent
Huber et al.

(10) Patent No.: US 9,709,380 B2
(45) Date of Patent: Jul. 18, 2017

(54) METHOD FOR REDUCING THE DIMENSIONALITY OF A SPATIALLY REGISTERED SIGNAL DERIVED FROM THE OPTICAL PROPERTIES OF A SAMPLE, AND DEVICE THEREFOR

(71) Applicant: Ludwig Maximilians Universität München, München (DE)

(72) Inventors: Robert Alexander Huber, Schnaitsee (DE); Thomas Klein, Munich (DE); Wolfgang Wieser, Munich (DE)

(73) Assignee: Ludwig-Maximilians-Universität München, München (DE)

( * ) Notice: Subject to any disclaimer, the term of this patent is extended or adjusted under 35 U.S.C. 154(b) by 96 days.

(21) Appl. No.: 14/386,658

(22) PCT Filed: Mar. 21, 2013

(86) PCT No.: PCT/EP2013/000866
§ 371 (c)(1),
(2) Date: Sep. 19, 2014

(87) PCT Pub. No.: WO2013/139481
PCT Pub. Date: Sep. 26, 2013

(65) Prior Publication Data
US 2015/0055136 A1  Feb. 26, 2015

(30) Foreign Application Priority Data
Mar. 21, 2012  (DE) .................. 10 2012 102 424

(51) Int. Cl.
*G01B 9/02*  (2006.01)

(52) U.S. Cl.
CPC ..... *G01B 9/02091* (2013.01); *G01B 9/02004* (2013.01); *G01B 9/02041* (2013.01);
(Continued)

(58) Field of Classification Search
CPC ..... A61B 3/102; A61B 5/0066; A61B 5/0073; A61B 5/0084; A61B 5/6852;
(Continued)

(56) References Cited

U.S. PATENT DOCUMENTS 5,644,642 A  7/1997  Kirschbaum
5,975,697 A  11/1999  Podoleanu et al.
(Continued)

FOREIGN PATENT DOCUMENTS

WO  WO-2006/058735 A1  6/2006
WO  WO-2010/026197  3/2010
WO  WO-2011/033031  3/2011

OTHER PUBLICATIONS

Adler et al., Phase sensitive optical coherence tomography using buffered Fourier Domain Mode Locked lasers at up to 370,000 scans per second, SPIE, (2007).
(Continued)

*Primary Examiner* — Michael P Lapage
(74) *Attorney, Agent, or Firm* — Marshall, Gerstein & Borun LLP (57) ABSTRACT

At least one embodiment of the method is designed to create a two-dimensional image of a three-dimensional sample. The method comprises the following steps: provision of a wave-length-tunable light source (1) that emits primary radiation (P) with wavelengths that vary over time; sampling of location points of the sample (2) with the primary radiation (P); collection of secondary radiation (S), wherein the secondary radiation (S) is a part of the primary radiation (P) reflected by the sample (2); creation of an interferometer-based detection signal for a plurality of sample areas, each with at least one location point, using a detection unit (4), wherein the detection signal is created as a difference signal from two output signals of a beam splitter (61) that receives reference radiation (R) and/or secondary radiation (S) at two
(Continued)

inputs, wherein the reference radiation (R) is a portion of the primary radiation (P) that is not guided to the sample (2); and determination of a brightness value for at least one of the sample areas from the associated detection signal, wherein the determination of the brightness values is not substantially based on the summation of the individual signal amplitudes of the results of a Fourier transformation.

21 Claims, 3 Drawing Sheets

(52) U.S. Cl.
CPC ..... *G01B 9/02048* (2013.01); *G01B 9/02069* (2013.01); *G01B 9/02083* (2013.01); *G01B 2290/45* (2013.01)

(58) Field of Classification Search
CPC  A61B 5/0059; A61B 5/7257; G01B 9/02002; G01B 9/02004; G01B 9/02044; G01B 9/02083; G01B 9/0209; G01B 9/02091; G01B 11/2441; G01B 2290/45; G01B 9/02007; G01B 9/02087; G01N 21/4795
See application file for complete search history.

(56) References Cited

U.S. PATENT DOCUMENTS

| | | | | |
|---|---|---|---|---|
| 6,002,480 | A * | 12/1999 | Izatt | G01J 3/4412 356/479 |
| 2003/0081220 | A1* | 5/2003 | Ostrovsky | G01N 21/4795 356/479 |
| 2006/0119858 | A1 | 6/2006 | Knighton et al. | |
| 2006/0187537 | A1 | 8/2006 | Huber et al. | |
| 2006/0279742 | A1 | 12/2006 | Tearney et al. | |
| 2007/0188765 | A1* | 8/2007 | Zhao | G01J 3/02 356/479 |
| 2009/0046295 | A1 | 2/2009 | Kemp et al. | |
| 2010/0103964 | A1 | 4/2010 | Huber | |
| 2010/0141954 | A1* | 6/2010 | Kobayashi | G01B 9/02007 356/479 |
| 2011/0109911 | A1* | 5/2011 | Podoleanu | A61B 3/102 356/451 |
| 2011/0157552 | A1* | 6/2011 | Bublitz | A61B 3/1005 351/209 |
| 2011/0273667 | A1 | 11/2011 | Knighton et al. | |

OTHER PUBLICATIONS

Blatter et al., Intrasweep phase-sensitive optical coherence tomography for noncontact optical photoacoustic imaging, Optics Letters, 70(21):4368-70 (Nov. 2012).
International Search Report, corresponding International Application No. PCT/EP2013/000865, mailed Jul. 17, 2013.
Sarunic et al., Instantaneous complex conjugate resolved spectral domain and swept-source OCT using 3×3 fiber couplers, Optics Express, 13(3):957-67 (Jan. 2005).
International preliminary report on patentability from international Application No. PCT/EP2013/000865 dated Oct. 2, 2014.
Biedermann et al., Real time en face Fourier-domain optical coherence tomography with direct hardware frequency demodulation, Optics Lett., 33(21):2556-8 (2008).
International Search Report for corresponding International Application No. PCT/EP2013/000866, mailed Jul. 5, 2013 [English translation included].
Podoleanu et al., Combinations of techniques in imaging the retina with high resolution, Progress in Retinal and Eye Research, 27(4):474-84 (2008).
Yasuno et al., In vivo high-contrast imaging of deep posterior eye by 1-um swept source optical coherence tomography and scattering optical coherence angiography, Optics Exp., 15(10):6127-31 (2007).

* cited by examiner

METHOD FOR REDUCING THE DIMENSIONALITY OF A SPATIALLY REGISTERED SIGNAL DERIVED FROM THE OPTICAL PROPERTIES OF A SAMPLE, AND DEVICE THEREFOR

A method for reducing the dimensionality of a spatially registered signal derived from the optical properties of a sample and a corresponding device are disclosed.

Publication US 2011/0273667 A1 pertains to an optical coherence tomography device for anatomical imaging.

An objective to be attained consists of disclosing a method and a device for efficiently generating a two-dimensional image of a three-dimensional sample.

This objective is attained with the method and the device according to the independent claims. Enhancements are disclosed in the dependent claims.

One concrete example for the application of such a method is the highly sensitive generation of a two-dimensional image of a sample that is three-dimensionally recorded in an interferometric fashion. A three-dimensionally scanned sample consists, for example, of biological tissue that is scanned by means of optical coherence tomography. In this example, the reduction of the dimensionality would consist of the generation of a 2-dimensional en-face image of this sample.

The reduction of the dimensionality of a spatially registered signal derived from the optical properties of a sample generally refers to the following sequence: a property (such as, for example, a diffusion factor) that can be represented by an n-dimensional matrix (such as, for example, a N×M×L matrix in three dimensions) is reduced to a small quantity of signal values or data values that in most instances can be represented by a matrix of reduced dimensionality (such as, for example, a two-dimensional N'×M' matrix).

The method described herein is particularly characterized by a high efficiency and a high speed. According to at least one embodiment, for example, this method can eliminate the need for carrying out a Fourier transformation.

According to at least one embodiment, the method is designed for generating a two-dimensional image of a three-dimensional sample. The term two-dimensional image refers, in particular, to the fact that the image consists of a top view of the sample, i.e. it contains no depth information or essentially no depth information. Such an image is also referred to as an en-face image. The term three-dimensional sample may refer to the fact that the sample has a depth profile to be measured, particularly along a direction extending perpendicular to the principal directions of the two-dimensional image.

The image generated with the method preferably represents the intensity of the light backscattered by the sample. According to at least one embodiment, the backscattering intensity of the light is represented by brightness values or grayscale values. However, a different type of representation such as false-color coding or variable transparency would also be possible. In the following description, all coded forms of backscattering intensity are in an exemplary fashion represented by brightness values.

Depending on the design, the term brightness value may refer to a property of the visual impression that can be illustrated on an output device, but also to an optical property of the sample that preferably is variable in space. One particular sample property of this type is the intensity of the backscatter signal.

Depending on the respective application, the term brightness value refers to different variables along the signal path starting from the sample:
the backscattering intensity of the sample,
the strength of the interferometric oscillation signal such as, for example, a fringe amplitude,
a signal strength of the electrical signal after the detection by means of the photodetector,
a numerical quantity value of a digitized signal and/or color brightness information.

The term brightness value is henceforth used synonymously.

The final representation in the form of an image may also include other variables based on a plurality of backscattering properties of the sample, at least some of which were measured in accordance with the described methods.

According to at least one embodiment, depth-resolved information preferably is not substantially included in the calculation or measurement of the generalized brightness value described.

According to at least one embodiment, no volumetric information preferably is substantially included in the calculation or measurement of the generalized brightness value described.

According to at least one embodiment, no z-information preferably is substantially included in the calculation or measurement of the generalized brightness value described.

According to at least one embodiment, depth-resolved information with an axial resolution of worse than 10 µm, particularly worse than 20 µm, especially worse than 50 µm, preferably is included in the calculation or measurement of the generalized brightness value described.

According to at least one embodiment, depth-resolved information with an axial resolution of worse than 2×, particularly 5×, especially 10×, the physically attainable axial resolution of the light source is preferably included in the calculation or measurement of the generalized brightness value described.

According to at least one embodiment, the method comprises the step of providing and/or operating a light source. The light source preferably emits a primary radiation with a broadband spectrum. The term "broadband" spectrum may refer to the quotient of the spectral width and a central wavelength amounting to at least 0.005 or at least 0.02 or at least 0.06 or at least 0.10. In this case, the spectral width particularly is a full width at half maximum or FWHM. The central wavelength particularly is the wavelength with the highest spectral energy density. For example, the central wavelength lies in the near-infrared spectral region, particularly at approximately 800 nm or at approximately 1050 nm or at approximately 1300 nm or at approximately 1550 nm.

The tuning rate or repetition rate particularly is the inverse time, in which individual wavelength cycles take place in succession. In this respect, very high rates that were only realized recently such as, for example, rates in excess of 50 kHz, particularly in excess of 150 kHz, especially in excess of 500 kHz or 1 MHz, are of particular interest.

According to at least one embodiment, the method comprises the step of scanning and/or sampling a plurality of image points and/or location points of the sample with the primary radiation. The image points are also referred to as pixels. The term scanning may refer to the primary radiation being guided over the sample point-by-point, for example, by means of a movable micromechanical mirror. The image points therefore are not scanned simultaneously, but rather in succession. This type of scanning particularly concerns the two-dimensional scanning of columns and lines of image points/pixels.

According to at least one embodiment, the method comprises the step of collecting a secondary radiation. The secondary radiation is a portion of the primary radiation that is reflected by the sample. The collection is realized, in particular, with an optical system such as, for example, a fiber-optical system, a converging lens, mirrors and/or a microscope lens.

According to at least one embodiment of the method, the detection of the secondary radiation takes place wavelength-resolved in time. Wavelength-resolved in time may refer to the different wavelengths occurring successively, wherein this is realized by means of a wavelength-tunable light source in the present invention.

According to at least one embodiment, the secondary radiation is detected for each individual image point. It is preferred to forgo averaging over several of the image points, but to rather evaluate the information, as well as the secondary radiation, of each individual image point separately. In this case, a detection signal is preferably generated for each of the image points with a detection unit. The detection signal is interferometer-based, i.e. it particularly concerns an interference signal that involves the secondary radiation.

According to at least one embodiment, a brightness value is determined from the associated detection signal for each of the image points or for a plurality of object regions and/or sample areas that respectively contain one or more of the image points. The brightness value for an object region can be determined by means of averaging over several image points. For example, the object region has the shape of a circular surface area or a rectangular surface area, but may also be shaped in an annular fashion.

The term brightness value refers, in particular, to the intensity, strength and/or brightness of the detected secondary radiation. The brightness value may consist, for example, of an 8-bit grayscale coding and/or a color coding. The coding may be realized in a weighted fashion, for example, with a nonlinear compression such as, e.g., logarithmizing.

According to at least one embodiment, the determination of the brightness values from the detection signals does not include an integral transformation or a Fourier transformation or a summation of all values of the result of a Fourier transformation. The term Fourier transformation particularly includes: a fast Fourier transformation or FFT, a non-uniform FFT or NU-FFT and a discrete cosine transformation or DCT. Only comparatively simple mathematical operations such as a summation, a summation of amounts or squares or averaging and/or spectral filtering, for example, with a FIR filter are used in the determination of the brightness values.

According to at least one embodiment, the described data processing is combined with other data conditioning steps, preferably methods of the type used in optical coherence tomography.

According to at least one embodiment, the described data processing is combined with the processing of additional data.

According to at least one embodiment, the described data processing is only carried out on one or more subsets.

In at least one embodiment, the method is designed for generating a two-dimensional image of a three-dimensional sample. The method comprises the following steps:

providing a wavelength-tunable light source that emits primary radiation with a time-variant wavelength, sampling location points of the sample with the primary radiation, collecting secondary radiation, wherein the secondary radiation is a portion of the primary radiation reflected by the sample, generating an interferometer-based detection signal for a plurality of sample areas that respectively contain at least one location point by means of a detection unit, wherein the detection signal is generated in the form of a differential signal between two output signals of a beam splitter that respectively receives reference radiation and secondary radiation at two inputs, wherein the reference radiation is a portion of the primary radiation that is not routed to the sample, and determining a brightness value for at least one of the sample areas from the associated detection signal, wherein the determination of the brightness values is not substantially based on the summation of the individual signal amplitudes of the result of a Fourier transformation.

Three-dimensional frames of objects are generated, in particular, with optical coherence tomography or OCT systems. In order to adjust the OCT system and to realize a better comparison with conventional two-dimensional imaging methods, it is desirable to generate a two-dimensional image that is also referred to as an en-face image. One option for generating such an image consists of adding a scanning laser ophthalmoscope or SLO to the OCT system. However, such a SLO features its own laser light source, as well as a separate detector, particularly in the form of an avalanche photodiode. However, such separate SLOs are comparatively expensive and require additional adjustment effort.

Another option consists of generating the en-face image from the three-dimensional data of the OCT system. However, operations that take up significant computing time, particularly Fourier transformations, are required for each individual image point in this case. At the high data rates required, in particular, for generating several en-face images per second, e.g., for an adjustment of the OCT system, this would require significant computing capacities. A method of this type is described in publication U.S. Pat. No. 5,644,642 A, the disclosure of which is hereby incorporated into the present application by reference.

In the described method, components of the OCT system preferably can be utilized for generating the en-face image, wherein only comparatively low computing capacities are required and the adjustment effort is reduced. The described method can also be used in so-called full-field OCTs.

In at least one embodiment, the method serves for reducing the dimensionality of a spatially registered signal derived from the optical properties of a sample. In order to adjust an amplification factor for an OCT application, for example, it is possible to average the signal of the sample line-by-line. To this end, the two-dimensional image can be generated from the signal of the sample before or, in particular, after the adjustment of the amplification factor.

In at least one embodiment, the determination of the brightness value is not substantially based on the summation of the individual signal amplitudes of the result of a Fourier transformation. In this context, not substantially means, for example, that the result of a Fourier transformation only contributes no more than 2% or no more than 10% to the brightness value.

In at least one embodiment, the determination of the brightness value is based on the AC component of an interference signal that is recorded in the time domain.

According to at least one embodiment, the brightness values are determined from an intensity and/or a strength and/or a radiofrequency power component of the detection signals for the individual image points and/or object regions. In this case, the radiofrequency power component preferably is exclusively determined in a frequency range from and including 3 kHz to 30 GHz or from and including 300 kHz to 10 GHz or in one or more frequency sub-ranges. In other words, a high-frequency power component of the detection signal is measured.

Alternatively to the power value or RMS value, it is also possible to measure a power-related signal such as, for example, an average amplitude, RMS square, the sum of the amounts or other mathematical standards. Furthermore, the measured signal can also be non-linearly compressed, for example logarithmized. Henceforth, the abbreviated term radiofrequency "power" is used synonymously.

According to one embodiment, the detection signal consists, in particular, of an interference signal from the secondary radiation and a reference radiation, wherein the reference radiation is a portion of the primary radiation that is not routed to the sample.

Such an interference signal has a plurality of interference maximums and interference minimums that are also referred to as interference pattern or fringes. The radiofrequency power component preferably concerns frequencies in the observed interference pattern of the detection signal.

According to at least one embodiment of the method, the detection unit comprises one or more radiation detectors for detecting the secondary radiation and for generating the detection signal. The radiofrequency power component is either determined from the detection signal directly by means of an analog measurement or in a digital fashion after the detection signal has been digitized.

The detection signal may be an optical signal, in particular, directly downstream of an interferometer, from which an electronic signal is subsequently generated. For example, an analog electronic signal is initially generated in the detection unit, e.g. with a photodiode. A digital signal can then be generated from the analog signal.

According to at least one embodiment, the light source is particularly tuned with a repetition rate of at least 3 kHz or at least 99 kHz or at least 199 kHz or at least 765 kHz. This may mean that the wavelength of the primary radiation periodically changes with the indicated repetition rate. Such a light source is also referred to as a swept source.

According to at least one embodiment, frequencies that lie below the repetition rate or below three-times the repetition rate or below ten-times the repetition rate or below fifty-times the repetition rate are neglected or suppressed in the determination of the brightness values. In other words, high-pass filtering of the detection signals is carried out in this case.

According to at least one embodiment, the method comprises the step of recording a three-dimensional image of the sample. This may mean, in particular, that depth information of the sample is measured in an interferometric fashion.

According to at least one embodiment, the primary radiation has a maximum coherence length during the intended operation of the light source. The maximum coherence length is adjusted, in particular, in order to record the three-dimensional image of the sample. Alternatively, the coherence length may also be reduced for recording the three-dimensional image, e.g. in order to suppress fogging.

According to at least one embodiment, the light source is during the detection of the secondary radiation detuned for at least a portion of the image points in such a way that the coherence length of the primary radiation becomes smaller than the maximum coherence length for these image points, for example, by at least a factor of 1.5 or by at least a factor of 2. In other words, the light source is purposefully detuned for the detection of the en-face image.

According to at least one embodiment, a path length differential between the secondary radiation and the reference radiation is greater than the maximum coherence length of the primary radiation at least during the recording of some or all image points of the en-face image. In other words, the distance of the sample from an optical output of a device designed for this method may be greater than the distance that can be compensated by means of an adjustment of the optical path length of the reference radiation.

According to at least one embodiment, the detection signal is tapped in order to generate a three-dimensional image of the sample. The term "tapping" is used in order to indicate that the detection signal may be fed to the detection unit for the two-dimensional image, as well as to an arithmetic unit for generating the three-dimensional image. In other words, the detection unit and the arithmetic unit can be supplied with the detection signal in an electrically parallel fashion.

According to at least one embodiment, the detection signal is subjected to an integral transformation, particularly a Fourier transformation, for each of the image points in order to generate the three-dimensional image. Consequently, the interference pattern from the secondary radiation and the reference radiation, in particular, is Fourier-transformed for each individual image point or at least a portion of the image points, wherein depth scans can be generated by means of the Fourier transformation.

According to at least one embodiment, a principal impression made by the two-dimensional image is not or not substantially based on an operation and/or processing of the three-dimensional image and/or the data that forms the basis of the three-dimensional image.

It goes without saying that the basic data may also consist of data that, in principle, would be suitable for generating a 3-dimensional image, namely regardless of the fact if and/or when such an operation actually takes place. This preferably means that the described method operates based on non-transformed data or signals.

According to at least one embodiment, the principal impression made by the image is not or not substantially based on a trivial integral transformation.

According to at least one embodiment, AC components of the strength of the detection signal in a spectrally oscillatory range with frequencies of 2000/THz to 0.02/THz are, in particular, substantially included in the determination of the brightness values.

According to at least one embodiment, the reference radiation of the interferometer is during the measuring process temporarily reduced by more than a factor of 10 or blocked. Alternatively or additionally, the light source temporarily changes its emission characteristic, in particular, substantially during the measuring process.

According to at least one embodiment, such a change of the emission characteristic is a change of the wavelength tuning range, a change of the output, a change of the coherence properties, a change of the central wavelength, a change of the power history in time and/or changes caused by switching off active optical elements of the source.

According to at least one embodiment, a digital filter is used before or after the detection of the secondary radiation and the generation of the interferometer-based detection signal. Alternatively or additionally, an electronic analog filter is used before or after the detection of the secondary radiation and the generation of the interferometer-based detection signal.

According to at least one embodiment, a combination of a filtering arrangement and digital spectral detection is used.

According to at least one embodiment, a filter with variable transmission characteristic is used before or after the detection of the secondary radiation and/or the generation of the interferometer-based detection signal.

According to at least one embodiment, the transmission characteristic of a filter is changed synchronous with a sampling of values, particularly in an analog-digital converter on a radiation detector, before or after the detection of the secondary radiation and the generation of the interferometer-based detection signal.

According to at least one embodiment, the determination and/or the graphic illustration of the brightness values includes the subtraction of a signal background. Scaling may also be used for this purpose.

According to at least one embodiment, at least one brightness value is used for controlling an electronic amplification or attenuation of the detection signal. Alternatively or additionally, at least one brightness value is used for controlling the optical interferometric amplification or attenuation of the detection signal.

According to at least one embodiment, a signal strength and/or an intensity, in particular, of the secondary radiation is used for the electronic amplification of the detection signal. The maximum or the average signal strength, in particular, is used for this purpose. The signal strength can preferably be determined by measuring the radiofrequency power component of the detection signal. In this case, an amplification factor can be detected synchronously.

In addition, a device for generating a two-dimensional image of a three-dimensional sample is disclosed. It is particularly preferred that the device is suitable for carrying out a method according to one or more of the above-described embodiments. Characteristics disclosed with reference to the device therefore also apply to the method and vice versa.

In at least one embodiment, the device emits during the operation of the system primary radiation with a broadband spectrum. The device furthermore contains an optical system for collecting the secondary radiation, as well as a detection unit for detecting the secondary radiation wavelength-resolved in time and/or in space. The device comprises a radiofrequency power detector.

According to at least one embodiment, the device comprises a setup for time-encoded frequency domain OCT or swept-source OCT. Such a setup is disclosed in publication US 2006/187537 A1, the disclosure of which is hereby incorporated into the present application by reference.

According to at least one embodiment, the detection unit and the OCT setup jointly utilize the at least one radiation detector. In other words, no additional radiation detector is required for the detection unit and for the generation of the en-face image in this case.

According to at least one embodiment of the device, the radiation detector of the detection unit is located on an open end of an interferometer of the setup that is not used by the OCT setup. In this case, the radiation detector of the detection unit is independent of the setup. The radiation detector may consist of an avalanche photodiode or of a conventional photodiode.

A method and a device of the described type are elucidated in greater detail below with reference to exemplary embodiments that are illustrated in the drawings. In the individual figures, identical elements are identified by the same reference symbols. However, the illustrations are not true-two-scale and individual elements may in fact be illustrated excessively large in order to better comprehend the inventive principles.

Figure 1:
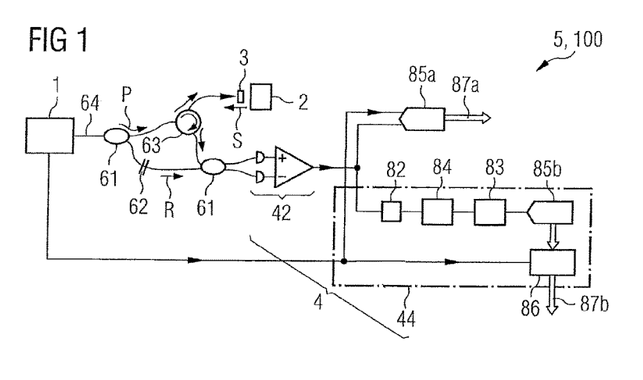

FIG. 1 schematically shows an exemplary embodiment of a device 100 for generating a two-dimensional en-face image of a three-dimensional sample 2. The device 100 comprises a setup 5 for time-encoded optical coherence tomography in the frequency domain. The setup 5 and the device 100 feature a common wavelength-tunable light source 1. The light source 1 may consist of a light source of the type described in publications US 2006/187537 A1, US 2010/0103964 A1, WO 2010/026197 A2 or WO 2011/033031 A1, the disclosures of which are hereby incorporated into the present application by reference. However, light sources other than those described above such as, for example, surface-emitting lasers with a vertical cavity or VCSELs or MEMS-based light sources may also be used.

A primary radiation P that is symbolized by arrows is split in optical fibers 64 in a beam splitter 61. A portion of the primary radiation P is routed to an optical system 3 and to a sample 2 by means of an optical circulator 63. A secondary radiation S consisting of a portion of the primary radiation P reflected by the sample 2 is collected by the optical system 3 and fed to another beam splitter 61 by means of the circulator 63. The secondary radiation S interferes with the reference radiation R in the beam splitter 61. An optical delay loop 62 is arranged in a reference arm and serves for the length compensation of an optical path of the secondary radiation S and the reference radiation R. The detection of an interference pattern or fringes takes place in a radiation detector 42 that features two photodiodes, as well as a differential operational amplifier.

The signal being output by the radiation detector 42 is symbolized by straight arrow lines and routed to a fast analog-digital converter or ADC 85a. The ADC 85a is designed for data rates on the order of gigasamples per second and comparatively expensive. At a data output 87a, the ADC 85a outputs a signal that makes it possible to generate a three-dimensional image of the sample 2, particularly by means of Fourier transformation.

In order to generate the two-dimensional en-face image, the device 100 comprises a radiofrequency power detector 44 that is framed with a dot-dash line. A power detector element 84 for determining a radiofrequency power component of the detector signal of the radiation detector 42 is arranged between a high-pass filter 82 and a low-pass filter 83. The high-pass filter 82 can be used, in particular, for preventing reflections from very shallow OCT depths. The high-pass filter 82 can also replace a background subtraction. The power detector element 84 consists, for example, of an AD8318 of the manufacturer Analog Devices Inc., wherein this device is designed, in particular, for logarithmically determining the intensity of high-frequency signals in the range of 1 MHz to 8 GHz. The high-pass filter 82, as well as the low-pass filter 83 and the power detector element 84, are realized with the aid of an AD8318, i.e. a very cost-efficient component.

A comparatively slow analog-digital converter 85b is arranged downstream of these components, wherein this analog-digital converter is cost-efficient and designed for data rates of approximately 10 megasamples per second to 50 megasamples per second. A programmable logic or FPGA 86 is arranged downstream of the ADC 85b and realized, for example, in the form of a component XC6SLX9.

The device 100 and the setup 5 make it possible to generate the en-face image and the three-dimensional image of the sample synchronously by means of the same light source 1, the same optical system 3 and the same two-dimensional scanner. In this case, the tuning rate of the light source 1 lies, for example, between 250 kHz and 500 kHz. In this way, several frames per second can be displayed with a resolution, for example, of 500 pixels×500 pixels. The recording of the en-face image and the recording of the three-dimensional data sets can be realized simultaneously.

Depth information of the sample 3 is encoded in the frequency and a backscattering intensity is encoded in the amplitude of the signal of the radiation detector 42. The frequency therefore is uninteresting for the en-face imaging. The backscattered intensity essentially results from the amplitude only. Consequently, the effective value or RMS value of the signal or a power thereof, as well as other mathematical standards, are particularly suitable as a measure for the backscattered intensity. A technically simple realization is achieved with components like the AD8318. This component particularly delivers a voltage value that increases proportionally with the high-frequency power and therefore a measure for the backscattered intensity.

This voltage value can be sampled with the comparatively slow analog-digital converter 85b and directly converted into the brightness values of the corresponding image points without requiring elaborate computations such as Fourier transformations. Since the detection profits from a heterodyne amplification in the interferometer of the OCT setup 5, no particularly sensitive diodes such as avalanche photodiodes are required. Consequently, the signal for the en-face image can also be directly tapped at the radiation detector 42 like the signal for the three-dimensional image. The component AD8318 particularly offers an analog bandwidth of about 8 GHz, which is sufficient for OCT systems with scanning speeds as high as the megahertz range. A real bandwidth, e.g., of approximately 1 GHz is usually defined by the differential photodiode used.

Figure 2A:
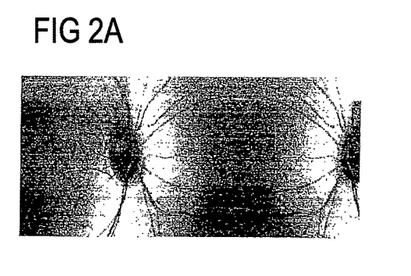
FIGS. 2A and 2B show en-face images generated with exemplary embodiments of devices described herein.

FIG. 2A shows an en-face image of a human retina that was recorded by means of the device according to FIG. 1 with a repetition rate of 800 kHz and a wavelength of 1060 nm. In the image according to FIG. 2A, a path length differential between the secondary radiation S and the reference radiation R is smaller than a coherence length of the primary radiation P. The coherence length lies in the range of a few centimeters in this case.

Figure 2B:
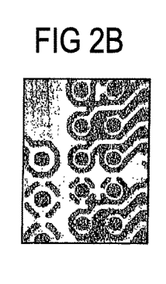

For demonstration purposes, FIG. 2B shows an en-face image of a printed circuit board that was recorded with a path length differential between the secondary radiation S and the reference radiation R of approximately 2.6 m and therefore far outside the coherence length. This image was also recorded with a device 100 according to FIG. 1. The en-face image can be recorded with a conventional InGaAs photodiode, in particular, due to the heterodyne amplification in the interferometer of the secondary radiation S with at least partially coherent radiation from the light source 1. In this case, the coherence length of the primary radiation P can be purposefully varied for recording the image according to FIG. 2B in order to realize several phase jumps in the primary radiation P and to therefore increase a residual coherence with the secondary radiation S or to generally improve the signal quality.

In order to realize a broad dynamic range in the radiofrequency power detector 44 and therefore numerous gray scales in the en-face image, the detection signal may be compressed with a non-linear function, preferably logarithmized, prior to digitizing. Logarithmizing of the signal is already carried out by the component AD8318.

Due to potentially different backscattering from image point to image point of the en-face image or due to a signal background, it is preferred that frequency components below the tuning rate of the light source are not taken into consideration in the determination of the radiofrequency power component. In the component AD8318, in particular, the required bandwidth can be adjusted by means of a capacitor. If the light source 1 is designed for different repetition rates such as, for example, for 250 kHz and for 800 kHz, it is advantageous to permanently adjust a cut-off frequency to the highest required value. Alternatively, the cut-off frequency may be variably adjustable in dependence on the repetition rate. In order to obtain good results at low repetition rates of the light source 1, the signal can be numerically scaled down to lower bandwidths, for example, by means of a FIR filter or simple averaging and/or summation.

The sampling of values in the comparatively slow ADC 85b preferably takes place synchronous with the repetition rate of the light source 1 and particularly amounts to an integral multiple of the repetition rate. For example, an optical k-clock can be used for this purpose.

A synchronization between the light source 1, scanners of the optical system 3 and the ADC 85b preferably takes place in the radiofrequency power detector 44. In this way, it can be ensured that the sampled output values belong to the corresponding tuning interval of the light source 1 and to the corresponding image point controlled by the scanner. For example, if the light source 1 has a tuning rate of 50 kHz, wavelength tuning takes place over a time period of approximately 10 μs and is followed by retuning over 10 μs, wherein the retuning is, for example, not used. The ADC 85b and the power detector 44 operate, for example, with a sampling rate of 5 MHz. Consequently, 100 data points are created per image point. Only the 50 data points belonging to the corresponding tuning direction are used in this case and the 50 data points of the retuning are discarded.

The voltage values at the output of the power detector element 84 and/or the low-pass 83 may also be sampled in a faster ADC 85a. The comparatively slow ADC 85b can be eliminated in this case. If the values of the signal of the radiation detector 42 are already logarithmized, in particular, 8 bit of the fast ADC 85a may suffice for this purpose. The resolution can be optionally increased, for example, by 2 bit or 4 bit by means of so-called oversampling and/or by averaging successive data points. However, a simultaneous detection of the en-face image and the three-dimensional image of the sample is no longer possible in this case because one input of the fast ADC 85a is selectively switched to the power detector element 84 or to the output of the radiation detector 42.

It is furthermore possible to utilize the fast ADC 85a in a time-division multiplexing method. For example, the entire data set for the three-dimensional image of the sample 2 with the exception of a few areas in the approximate center of the image that can also be represented in the form of OCT depth scans may be recorded in the en-face mode, namely also in the form of an image that is averaged over several tuning rates or so-called frames. Particularly the lacking lines in the en-face image, which are used for the three-dimensional OCT data, are hardly apparent in the en-face image or can be calculated from the OCT data of the depth scans with comparatively little computing effort due to the significantly smaller number of data points.

Improved detection properties can be achieved if an optoelectronic detection bandwidth becomes greater than an instantaneous line width of the light source 1.

If it is not intended to measure a backscattering intensity of the sample, the method may also use incident light from an independent source to be examined, for example, in order to carry out imaging spectroscopy thereon, particularly sensitive hyperspectral imaging.

In contrast to the illustration in FIG. 1, it is possible to implement the radiofrequency power detector 44 digitally rather than in an analog fashion. To this end, the data from the comparatively fast ADC 85a is initially routed into a programmable logic or FPGA or into an application-specific integrated circuit or ASIC if the ADC 85a is not already integrated and/or implemented in the corresponding components. Alternatively, the digital power detector may be implemented in the form of a program in a computer. The power detector may be alternatively implemented on a graphics board (GPU). A digital signal processor (DSP) may generally also be used. However, no computationally elaborate Fourier transformation, but rather only the determination of an RMS value, for example, is required in this case for determining the high-frequency power from the data stream of the fast ADC 85a. Such a digital radiofrequency power detector may also be provided instead or in addition to the analog radiofrequency power detector in all other exemplary embodiments. A digital power detector makes it possible to efficiently realize a background subtraction and/or a FIR filter that can be easily adapted.

Figure 3:
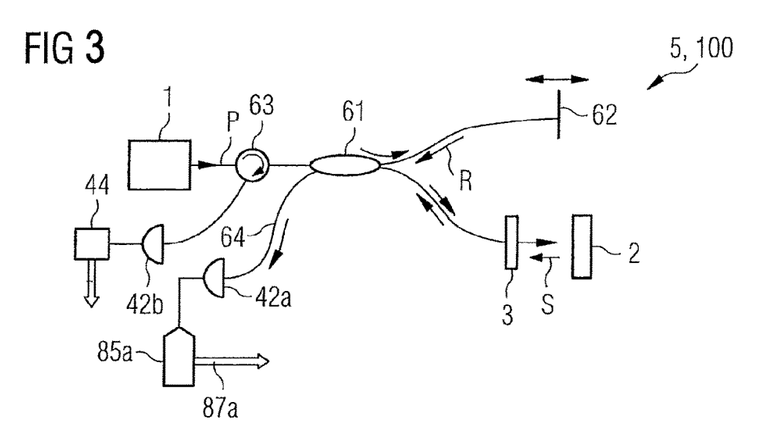
FIGS. 3 to 8 show exemplary embodiments of devices described herein in the form of schematic illustrations.

In the exemplary embodiment according to FIG. 3, the device 100 for generating the en-face image comprises a setup 5 for time-encoded optical coherence tomography in the frequency domain. The radiation detector 42b is arranged downstream of the beam splitter 61 in a direction extending away from the sample 2 and therefore situated on an open arm of the interferometer of the setup 5 and connected to the interferometer by means of the optical circulator 63. The radiation detector 42b may consist of a conventional photodiode or an avalanche photodiode. The radiofrequency power detector 44 may be implemented in an analog fashion, e.g., as illustrated in FIG. 1 or digitally.

Figure 4:
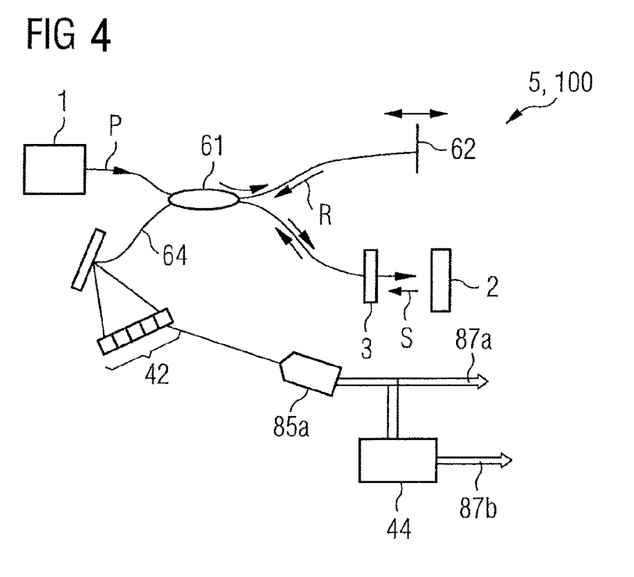

In the exemplary embodiment according to FIG. 4, the setup 5 is designed for spectral-encoded optical coherence tomography in the frequency domain. The radiation detector 42 is used by the OCT setup 5, as well as by the detection unit 4 and the radiofrequency power detector 44, and consists, for example, of a CCD camera or a line of photodiodes. According to FIG. 4, the interference pattern is then not encoded in the time domain, but rather spatially and over the wavelength. The representation by means of wavelengths from the spectral encoding is equivalent to the representation of the time-encoded spectral analysis. In this case, the radiofrequency power detector 44 preferably operates digitally. Optional components such as an additional high-pass filter or a high-pass filter integrated into the same component and devices for the subtraction of an optical background may be provided in all exemplary embodiments, but are not separately illustrated.

As in the exemplary embodiment according to FIG. 1, only few and comparatively inexpensive components are required in the OCT setup 5 for the efficient generation of the en-face image of the sample 2, wherein particularly the radiation detector 42, as well as the light source 1, can be used for generating the three-dimensional OCT image, as well as for generating the en-face image.

Figure 5:
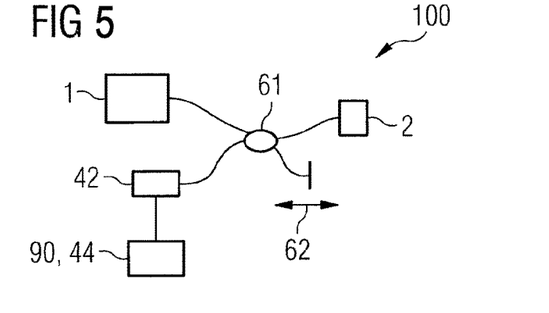

In the exemplary embodiment according to FIG. 5, the radiation detector 42 is realized in the form of a spectrometer and/or a camera. The detection of the interference signal takes place wavelength-resolved in space. The power detector 44 is implemented in the form of a computer program in a computer 90 and operates digitally. Alternatively, one of the following components in integrated or separate form would also be suitable for carrying out the described operations: an ASIC (application-specific integrated circuit), a FPGA (field-programmable gate array), a DSP (digital signal processor) or a GPU (graphic processing unit—graphics board of a computer).

Figure 6:
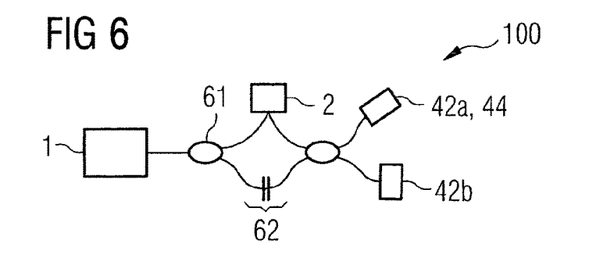

According to FIG. 6, the radiation detector 42a is realized, in particular, in the form of an avalanche photodiode. The brightness values for the en-face image are determined from the signal of the radiation detector 42a in this case. The power detector 44 may operate digitally or in an analog fashion. The separate radiation detector 42b serves for the data acquisition for the three-dimensional image.

Figure 7:
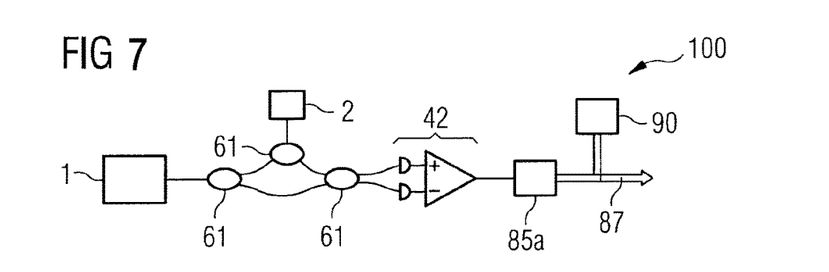

In FIG. 7, the signal of the particularly differential radiation detector 42 is digitized in the fast ADC 85a. This digitized signal is then processed into the en-face image in the computer 90 with the aid of the digital power detector 44. The same digitized signal also serves for generating the three-dimensional image of the sample 2.

Figure 8:
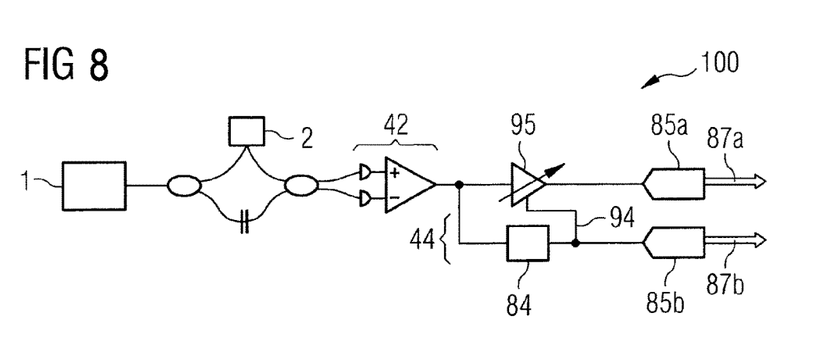

FIG. 8 shows an exemplary embodiment of the device 100, in which a signal 94 of the power detector element 84 is used for adjusting an amplification factor of a variable amplifier 95. The amplification factor preferably can be detected simultaneously.

The described invention is not restricted by the description of exemplary embodiments. In fact, the invention comprises any new characteristic, as well as any combination of characteristics, wherein this includes, in particular, any combination of characteristics in the claims even if this characteristic or this combination is not explicitly mentioned in the claims or the description of exemplary embodiments.

The invention claimed is:

1. A method for reducing the dimensionality of a spatially registered signal derived from the optical properties of a sample, the method comprising:
   providing a wavelength-tunable light source that emits primary radiation with time-variant wavelength;
   sampling location points of the sample with the primary radiation;
   collecting secondary radiation, wherein the secondary radiation is a portion of the primary radiation reflected by the sample;
   generating an interferometer-based detection signal for each of a plurality of sample areas that respectively contain at least one location point by a detection unit, wherein the detection signal is generated in the form of a differential signal between two output signals of a beam splitter that respectively receives reference radiation and secondary radiation at two inputs, wherein the reference radiation is a portion of the primary radiation that is not routed to the sample, and wherein depth information of said sample is encoded in the frequency of said interferometer-based detection signal; and removing said depth information from the interferometer-based detection signal and thereby reducing the dimensionality of said spatially registered signal by determining a brightness value for at least one of the sample areas from a radiofrequency power component of the detection signal for the individual sample areas over a frequency range from and including 3 kHz to 30 GHz or over at least one frequency sub-range thereof, to assess backscattering intensity of the secondary radiation within said frequency range or subrange, thereby removing said depth information contained in individual frequencies within said frequency range or sub-range from said spatially registered signal.

2. The method according to claim 1,
in which the detection unit comprises one or more radiation detectors for the secondary radiation in order to generate the detection signal,
wherein the detection signal is digitized and the radiofrequency power component is determined after the digitizing.

3. The method according to claim 1,
in which the light source is periodically tuned with a repetition rate of at least 3 kHz and the wavelength of the primary radiation periodically changes with the repetition rate,
wherein frequencies below one-tenth of the repetition rate are suppressed or neglected in the determination of the brightness values.

4. The method according to claim 1,
wherein a path length differential between the secondary radiation and the reference radiation is, during operation of the light source, greater than a maximum coherence length of the primary radiation in at least a portion of the sample locations.

5. The method according to claim 4,
wherein the primary radiation is, during collection of the secondary radiation, varied for at least a portion of the sample areas in such a way that the associated detection signal for these location points in the portion of the sample areas is improved.

6. The method according to claim 1,
in which the detection signal is tapped in order to generate a three-dimensional image of the sample,
wherein the detection signal of each location point is subjected to an integral transformation in order to generate the three-dimensional image.

7. The method according to claim 1,
in which AC components of the strength of the detection signal in a spectrally oscillatory range with frequencies of 2000 1/THz to 0.02 1/THz are included in the determination of the brightness values.

8. The method according to claim 1,
in which the reference radiation of an interferometer is temporarily attenuated by at least a factor of 10 during the collection of the secondary radiation.

9. The method according to claim 8,
in which the light source temporarily changes its emission characteristic.

10. The method according to claim 1,
in which one of a digital or analog filter is used before or after the collection of the secondary radiation or the generation of the interferometer-based detection signal.

11. The method according to claim 1,
in which an electronic analog filter is used before or after the detection of the secondary radiation or the generation of the interferometer-based detection signal.

12. The method according to claim 1,
in which a combination of a filtering arrangement and digital spectral detection is used.

13. The method according to claim 1,
in which a filter with time-variable transmission characteristic is used before or after the detection of the secondary radiation or the generation of the interferometer-based detection signal.

14. The method according to claim 13,
in which the transmission characteristic of the filter is varied synchronous with the sampling.

15. The method according to claim 1,
in which the determination or a graphic illustration of the brightness values includes the subtraction of a signal background.

16. The method according to claim 1,
in which non-linear scaling is used in the determination and/or graphic illustration of the brightness values.

17. The method according to claim 1,
in which at least one brightness value or a signal strength or an intensity of the secondary radiation is used for controlling an electronic amplification or attenuation of the detection signal.

18. The method according to claim 1,
in which at least one brightness value or a signal strength or an intensity of the secondary radiation is used for controlling optical interferometric amplification or attenuation of the detection signal.

19. The method according to claim 18,
in which an amplification factor is detected synchronously.

20. The method according to claim 1,
in which a signal strength or an intensity of the secondary radiation is used for controlling electronic amplification of the detection signal.

21. The method according to claim 20,
in which the maximum or the time-averaged signal strength is used.

* * * * *